United States Patent
Hansen et al.

(10) Patent No.: US 12,460,985 B1
(45) Date of Patent: Nov. 4, 2025

(54) LEAK DETECTION SYSTEMS AND METHODS

(71) Applicant: United Services Automobile Association (USAA), San Antonio, TX (US)

(72) Inventors: Gregory David Hansen, San Antonio, TX (US); Andre Rene Buentello, San Antonio, TX (US); Jose L. Romero, Jr., San Antonio, TX (US); Nina Schuessler, San Antonio, TX (US); Galo M. Alava, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 148 days.

(21) Appl. No.: 17/550,680

(22) Filed: Dec. 14, 2021

Related U.S. Application Data

(60) Provisional application No. 63/128,414, filed on Dec. 21, 2020.

(51) Int. Cl.
| | |
|---|---|
| *G01M 3/16* | (2006.01) |
| *G01M 3/26* | (2006.01) |
| *G08B 21/18* | (2006.01) |
| *E04D 13/00* | (2006.01) |

(52) U.S. Cl.
CPC .............. *G01M 3/16* (2013.01); *G01M 3/26* (2013.01); *G08B 21/182* (2013.01); *E04D 13/006* (2013.01)

(58) Field of Classification Search
CPC ........ G01M 3/04; G01M 3/042; G01M 3/045; G01M 3/16; E04D 13/006
See application file for complete search history.

(56) References Cited

U.S. PATENT DOCUMENTS

| | | | | |
|---|---|---|---|---|
| 7,956,760 | B2* | 6/2011 | Hill | G01M 3/045 340/604 |
| 9,387,273 | B2* | 7/2016 | Kanakkanatt | G01N 21/81 |
| 10,213,344 | B2* | 2/2019 | Bogue | A61F 13/00059 |
| 10,426,672 | B2* | 10/2019 | Mihali | A61F 13/42 |
| 10,502,654 | B1 | 12/2019 | Schroeder et al. | |
| 2018/0093900 | A1* | 4/2018 | Dickson | C02F 1/001 |
| 2018/0180508 | A1* | 6/2018 | Ghodrati | G01M 3/042 |
| 2019/0170396 | A1* | 6/2019 | Azulay | F24H 15/429 |

(Continued)

FOREIGN PATENT DOCUMENTS

KR 101391762 B1 * 5/2014

OTHER PUBLICATIONS

Lee, Water Leak Detection Attachment for the Liquid Transportation Pipe, FIT Machine Translation (Year: 2014).*

*Primary Examiner* — Erika J. Villaluna
(74) *Attorney, Agent, or Firm* — Fletcher Yoder P.C.

(57) ABSTRACT

A leak detection system includes a leak detection sensor assembly configured to be positioned on or within a component of a building. The leak detection sensor assembly includes multiple electrical conductors, an output device, and a fluid-absorber in contact with the multiple electrical conductors and the output device. The multiple electrical conductors, the output device, and the fluid-absorber are configured to define a closed electrical circuit with fluid present at the fluid-absorber and are configured to define an open electrical circuit without the fluid present at the fluid-absorber.

18 Claims, 3 Drawing Sheets

(56) References Cited

U.S. PATENT DOCUMENTS

| | | | |
|---|---|---|---|
| 2020/0033221 A1* | 1/2020 | Huang | G01M 3/04 |
| 2021/0215567 A1* | 7/2021 | Koo | G01M 3/18 |
| 2021/0388950 A1 | 12/2021 | Solomon et al. | |

* cited by examiner

LEAK DETECTION SYSTEMS AND METHODS

CROSS-REFERENCE TO RELATED APPLICATION

The present application claims the benefit of and priority to U.S. Provisional Patent Application Ser. No. 63/128,414, titled "LEAK DETECTION SYSTEMS AND METHODS," which was filed on Dec. 21, 2020, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Detection of a leak within a property (e.g., a real property, such as a building) is generally performed through an in-person, physical inspection of the property. For example, an individual may inspect the property in order to identify the leak at the property and to assess an extent of the leak at the property.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a leak detection system includes a leak detection sensor assembly configured to be positioned on or within a component of a building. The leak detection sensor assembly includes multiple electrical conductors, an output device, and a fluid-absorber in contact with the multiple electrical conductors and the output device. The multiple electrical conductors, the output device, and the fluid-absorber are configured to define a closed electrical circuit with fluid present at the fluid-absorber and are configured to define an open electrical circuit without the fluid present at the fluid-absorber.

In one embodiment, a leak detection sensor assembly includes a housing configured to be positioned on or within a component of a building. The leak detection sensor assembly also includes a material supported within the housing and configured to exhibit a change in color with fluid present at the material. The leak detection system assembly also includes a detector supported within the housing and configured to generate data indicative of the change in color. The leak detection sensor assembly also includes processing circuitry within the housing and configured to process the data to determine an occurrence of the change in color. The leak detection sensor assembly further includes an output device supported by the housing and configured to provide an output in response to the processing circuitry determining the occurrence of the change in color.

In one embodiment, a leak detection system includes a computing system with one or more processors. The leak detection system also includes multiple leak detection sensor assemblies, wherein a first leak detection sensor assembly of the multiple leak detection sensor assemblies includes a housing configured to be coupled to a component of a building, a material supported within the housing and configured to exhibit a change in color with fluid present at the material, a detector supported within the housing and configured to generate data indicative of the change in color, and a wireless communication component configured to wirelessly transmit the data indicative of the change in color to the computing system. The one or more processors are configured to create and to instruct display of a map that indicates a leak at a location of the first leak detection sensor assembly in response to receipt of the data indicative of the change in color.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
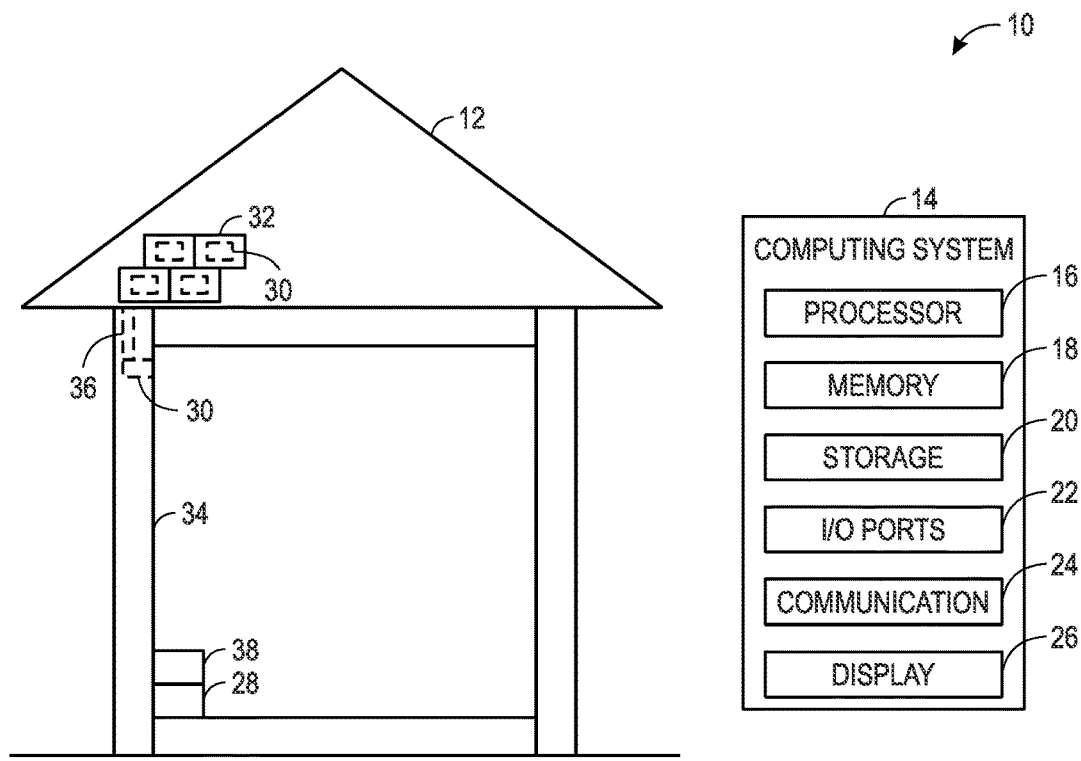
FIG. 1 illustrates a schematic diagram of a leak detection system within a property, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. As used herein, the term "computing system" refers to an electronic computing device such as, but not limited to, a single computer, virtual machine, virtual container, host, server, laptop, and/or mobile device, or to multiple electronic computing devices working together to perform the function described as being performed on or by the computing system.

As noted above, detection of a leak (e.g., fluid leak) within a property (e.g., a real property, such as a building) is generally performed through an in-person, physical inspection of the property. For example, an individual may inspect the property in order to identify the leak at the property and to assess an extent of the leak at the property. However, the leak may occur while the individual is not present at the property and/or the leak may not be visible to the individual (e.g., a water leak may be behind a wall of the property).

Accordingly, it is presently recognized that it would be beneficial to provide a leak detection system that is configured to detect leaks at the property. The leak detection system may include one or more leak detection sensor assemblies. For example, a leak detection sensor assembly may include a moisture indicator material, which may include a material (e.g., hydrochromic material) that changes color in response to contact with a fluid (e.g., water). The material that changes color in response to contact with the fluid may be a paint that may be applied over a surface, such as the surface of a roofing sheet or drywall. As another example, a leak detection sensor assembly may include one or more conductors (also referred to as electrical conductors) and a fluid absorber that form an open electrical circuit without a fluid and that form a closed electrical circuit with the fluid. As another example, a leak detection sensor assembly include one or more conductors that form a closed electrical circuit that is shorted with the fluid. The leak detection sensor assembly may be coupled to or embedded in building materials of the property, such as in roofing shingles, roofing sheets, flooring, drywall, or the like. The leak detection system may be configured to provide an alert (e.g., an audible alert via a speaker, a visual alert via a light emitter) that indicates presence of the fluid at the leak detection sensor assembly. For example, when the closed electrical circuit is formed with the fluid, a current may flow from a current source, through the closed electrical circuit, and to the light emitter to cause the light emitter to emit light for visualization by a user.

The leak detection system may include various other features, such as fluid-routing features (e.g., pores, fault lines, channels) within the building materials or structure of the property. The fluid-routing features may be configured to direct the fluid to a location within the property, such as a visible location that is visible to the user or a sensor location that includes the leak detection sensor assembly, to thereby facilitate detection of the leak. The leak detection system may include a fluid flow monitoring system that is configured to monitor an input fluid flow (e.g., input volume) into a fluid vessel (e.g., shower, sink, toilet) at the property and an output fluid flow (e.g., output volume) from the fluid vessel at the property. The fluid flow monitoring system may compare the input fluid flow to the output flow to determine a flow difference (e.g., volume difference). The fluid flow monitoring system may then compare the flow difference to a threshold and may determine that there is a leak at the fluid vessel in response to the flow difference exceeding the threshold. The threshold may take into account expected fluid loss due to temperature of the fluid (e.g., steam) and/or other factors (e.g., expected splashing out of the fluid vessel, such as during dish washing). The fluid flow monitoring system may provide an alert (e.g., an audible alert via a speaker, a visual alert via a light emitter) that indicates the leak at the fluid vessel.

The leak detection system may include a fluid drain monitoring system that is configured to monitor a fluid level within a drain conduit (e.g., pipe). The fluid level within the drain conduit may indicate inadequate drainage of the fluid through the drain conduit and a potential for a leak to develop upstream from the drain conduit (e.g., such as at an air conditioning unit that drains to the drain conduit of a vessel, such as a sink). The fluid drain monitoring system may include a level sensor (e.g., float sensor) that is configured to detect the fluid level within the drain conduit. For example, the level sensor may trigger a switch when the fluid level within the drain conduit exceeds a threshold, and the fluid drain monitoring system may provide an alert (e.g., an audible alert via a speaker, a visual alert via a light emitter) that indicates that the fluid level within the drain conduit exceeds the threshold. It should be appreciated that the one or more leak detection sensor assemblies, the fluid flow monitoring system, and/or the fluid drain monitoring system may be used alone or in combination to facilitate leak detection at the property.

With the foregoing in mind, FIG. 1 illustrates a schematic diagram of a leak detection system 10 for use within a property 12 (e.g., a real property, such as a building), in accordance with embodiments described herein. The leak detection system 10 may include a computing system 14, which may include any suitable computer device, such as a general-purpose personal computer, a laptop computer, a tablet computer, a mobile computer, or the like that is configured in accordance with present embodiments. The computing system 14 may include various types of components that assist the computing system 14 in performing various operations described herein. For example, the computing system 14 may include a processor 16, a memory 18, a storage 20, input/output (I/O) ports 22, a communication device 24 (e.g., computing system communication device), and/or a display 26. In some embodiments, the leak detection system 10 may include a hub 28 (e.g., control panel), which may be placed within the property 12. The hub 28 may be coupled to the computing system 14 or may include some or all of the components of the computing system 14 (e.g., may be configured to carry out some or all of the processes described herein as being carried out by the computing system 14).

As shown, the leak detection system 10 includes one or more leak detection sensor assemblies 30, which may include a moisture indicator, one or more conductors, and/or a fluid-absorber. For example, the moisture indicator may be positioned underneath a roofing shingle 32 or along an interior wall 34 of the property 12, and the moisture indicator may be a material (e.g., hydrochromic material) that is configured to change colors when exposed to a fluid. As another example, the one or more conductors and the fluid-absorber may be positioned underneath the roofing shingle 32 and/or within the interior wall 34 of the property 12, and the one or more conductors and the fluid-absorber may form a closed electrical circuit when exposed to the fluid (e.g., when the fluid-absorber absorbs a sufficient volume of the fluid to form the closed electrical circuit). It should be appreciated that the leak detection system 10 may include a current source 38, which may provide a current to the one or more leak detection sensor assemblies 30 that include the one or more conductors and the fluid-absorber to facilitate detection of the leak. The current source 38 may be included within the property 12 and/or may be part of the hub 28.

In some embodiments, one or more fluid-routing features 36 (e.g., fluid-router, pore, fault line, channel) may be provided to direct the fluid to the one or more leak detection sensor assemblies 30. For example, one fluid-routing feature 36 may be a pore (e.g., opening, conduit) that extends from a ceiling of the property 12 to the leak detection sensor assembly 30 that is positioned along the interior wall 34 to thereby guide the fluid that has leaked (e.g., through the roofing shingles 32) to the leak detection sensor assembly 30 to facilitate detection of the leak.

The leak detection system 10 may be configured to provide an alert (e.g., an audible alert via a speaker; a visual alert via a light emitter and/or via a display, such as the display 26) that indicates presence of the fluid at the leak detection sensor assembly 30. The alert may be provided via the change in the color of the moisture indicator that is positioned to be visualized by the user (e.g., standing inside an interior room bounded by the interior wall 34; without the user opening or manipulating the interior wall 34) and/or the alert may be provided via a light emitter that is positioned to receive current upon closure of the electrical circuit at the leak detection sensor assembly 30. In such cases, the alert is triggered automatically by the leak detection sensor assembly 30 being exposed to the fluid and without the computing system 14 providing instructions to provide the alert. However, the alert may be provided via the computing system 14 providing instructions to provide the alert, such as via the display 26 of the computing system 14, in response to detection and identification of the leak by the computing system 14 (e.g., following detection of the closure of the electrical circuit at the leak detection sensor assembly 30). In some embodiments, the computing system 14 may be configured to provide the alert, or an additional alert, to a remote device (e.g., a personal device, such as a mobile device, of the user). The computing system 14 may also instruct one or more other actions, such as shutting off a fluid supply that is a potential source of the leak (e.g., in a vicinity of the leak detection sensor assembly 30 that detected the leak).

Figure 2:
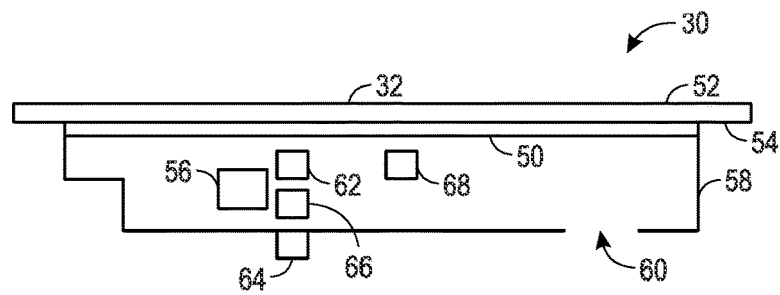
FIG. 2 illustrates a leak detection sensor assembly that may be used in the leak detection system of FIG. 1, wherein the leak detection sensor assembly includes a moisture indicator material, in accordance with embodiments described herein.

FIG. 2 illustrates a moisture indicator 50 that may be used within the leak detection sensor assembly 30 of the leak detection system 10 of FIG. 1, in accordance with embodiments described herein. The moisture indicator 50 may be a fluid-absorbing material (e.g., sponge), a plastic material, a paper material, a wooden material, and/or a metal (e.g., metal or metal alloy) material with a hydrochromic portion (e.g., a layer of hydrochromic paint or ink). The moisture indicator 50 may be configured to be integrated into or coupled to any surface or feature of the property, such as a painted sticker that may be adhered to a feature (e.g., wall, beam, shingle) of the property, an assembly that supports a painted sheet and that is configured to be fastened to a beam of the property, or a painted section of drywall that forms a wall of the property, for example.

To facilitate discussion, in FIG. 2, the moisture indicator 50 is shown to be positioned underneath the roofing shingle 32 of the property. For example, a first side 52 of the roofing shingle 32 may be exposed to an external environment outside of the property, and a second side 54 of the roofing shingle 32 may be exposed to an interior environment inside of the property. The moisture indicator 50 may be positioned along the second side 54 or otherwise within the interior environment inside of the property (e.g., layers of other material may be positioned between the roofing shingle 32 and the moisture indicator 50) to enable the moisture indicator 50 to detect a leak at the roofing shingle 32. For example, the moisture indicator 50 may change colors in response to the presence of the fluid at the moisture indicator 50, and the moisture indicator 50 may be visible to the user from the interior environment inside of the property. In this way, small and/or slow leaks of the fluid at the roofing shingle 32 may be readily identified by the user. Advantageously, the moisture indicator 50 does not need to be used in conjunction with the computing system or other electronic components or have a power source (e.g., battery), as the moisture indicator 50 may provide the alert to the user by the change in the color of the moisture indicator 50.

However, it should be appreciated that the moisture indicator 50 may be utilized in conjunction with a detector 56 (e.g., optical detector) that is configured to detect the change in the color to the moisture indicator 50. In such cases, the detector 56 may be configured to transmit signals (e.g., data; wirelessly via wireless communication components; via a wired connection) indicative of the change in the color to the computing system for processing, and the computing system may then provide the alert to the user (e.g., via the display) in response to detecting the change in color of the moisture indicator 50. The signals may be transmitted with an identifier to enable the computing system to match the signals to a location of the moisture indicator 50 and the detector 56 (e.g., via a look-up table in a database).

In some embodiments, the moisture indicator 50 and the detector 56 may be supported together within a housing 58 that may be configured to be coupled (e.g., adhered, fastened) to the property, such as to the drywall that forms a ceiling of an interior room of the property. When the housing 58 is coupled to the property, the moisture indicator 50 may be exposed to the drywall (or other surface) and change its color in the presence of fluid, and then the detector 56 may detect the change in the color. The signals from the detector 56 may be processed by processing circuitry 62 within the housing 58. In some embodiments, the housing 58 may support an output device 64 (e.g., light emitter, speaker, display, vibration mechanism, or other sensory output feature) to provide an alert to the user, such as in response to the processing circuitry 62 determining that the change in color of the moisture indicator 50 indicates presence of the fluid (e.g., leak). In some embodiments, the housing 58 may support a wireless communication component 66 to instruct another device (e.g., a mobile phone of the user, the hub, and/or the computing system) to provide the alert to the user, such as in response to the processing circuitry 62 determining that the change in color of the moisture indicator 50 indicates presence of the fluid (e.g., leak). Thus, the leak detection sensor assembly 30 may be self-contained (e.g., detect the leak and/or provide the alert) without relying on the computing system or other remote device to process the signals from the detector 56 and/or to determine the presence of the fluid. However, it should be appreciated that the signals from the detector 56 may be transmitted to and processed by the computing system, which may then instruct the output device 64 at the housing 58 to provide the alert to the user and/or another device to provide the alert to the user.

At least a portion (e.g., some or all) of the housing 58 may be transparent. For example, as shown, the housing 58 may also have a window 60 (e.g., transparent section of the housing 58; gap in the housing 58) that enables the user to view the moisture indicator 50 within the housing 58. To facilitate these techniques, a battery 68 or other power source may be provided within the housing 58 to provide power to the detector 56 and/or other components (e.g., wireless communication component, the processing circuitry, the output device) within the housing 58. In this way, the user may readily couple multiple different housings that each have one or more moisture indicators 50 and one or more detectors 56 at different locations of the property.

Figure 3:
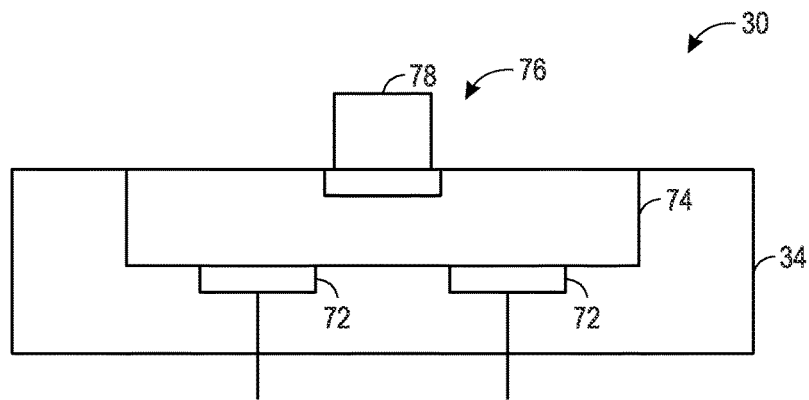
FIG. 3 illustrates a leak detection sensor assembly that may be used in the leak detection system of FIG. 1, wherein the leak detection sensor assembly includes one or more conductors and a fluid-absorber, in accordance with embodiments described herein.

FIG. 3 illustrates one or more conductors 72 (e.g., conductive pad, wire, wire grid, wire mesh) and a fluid-absorber 74 (e.g., foam, fabric, polymer) that that may be used within the leak detection sensor assembly 30 of the leak detection system 10 of FIG. 1, in accordance with embodiments described herein. The fluid-absorber 74 may be positioned to contact (e.g., cover) the one or more conductors 72. Then, in operation, a fluid that leaks into a vicinity of the leak detection sensor assembly 30 may be absorbed by the fluid-absorber 74, and the fluid within the fluid-absorber 74 may eventually have a sufficient volume to close an electrical circuit 76 (e.g., form a continuous or complete electrical circuit) by electrically connecting at least two of one or more conductors 72. Thus, the current may flow from the current source at the hub (or any other suitable current source, such as a battery), through a first wire that includes or is coupled to one of the conductors 72, through the fluid-absorber 74, and through a second wire that includes or is coupled to another one of the conductors 72 to return to the hub. As noted above, the hub may include or be communicatively coupled to the computing system, which may include processing components that are configured to detect completion of the electrical circuit 76 (e.g., via a change in resistance through the electrical circuit 76) and to provide the alert that indicates the presence of the leak to the user (e.g., via the display).

As shown, the leak detection sensor assembly 30 may include an output device 78, which may be a light emitter that is configured to emit light, a speaker that is configured to emit sound, or the like. Upon absorption of the sufficient volume of fluid by the fluid-absorber 74, the current may flow to the output device 78 (e.g., from the current source at the hub, through the first wire that includes or is coupled to one of the conductors 72, through the fluid-absorber 74, and to the output device 78) and may cause the output device 78 to provide the alert (e.g., emit the light, emit the sound). In some such embodiments, the leak detection sensor assembly 30 may provide the alert without the computing system providing the instructions to provide the alert. The leak detection sensor assembly 30 may be positioned on or within the roofing shingle, the interior wall 34, or any other suitable structure of the property. In some cases, the components of the leak detection sensor assembly 30 shown in FIG. 3 may be supported together within a housing that may be configured to be coupled (e.g., adhered, fastened) to the property, such as to the drywall that forms a ceiling of an interior room of the property. When the housing is coupled to the property, the conductors 72 and the fluid-absorber 74 may be exposed to the drywall (or other surface) to detect the presence of fluid, and then the output device 78 may be exposed (e.g., visible to the user) to provide the alert to the user. In this way, the user may readily couple multiple different housings that each have the components of the leak detection sensor assembly 30 at different locations of the property.

In some embodiments, the fluid-absorber 74 may be formed from a material that changes colors when exposed to the fluid (e.g., the moisture indicator 50 of FIG. 2) to thereby enable the leak detection sensor assembly 30 to provide the indication of the leak via the change in the color that can be visualized by the user and/or detected by a detector (e.g., the detector 56 of FIG. 2), as well as the indication of the leak via completion of the circuit with the output device 78. Alternatively, the material that changes color (e.g., paint) may be applied near or over (e.g., to cover) the fluid-absorber 74 so that absorption of the fluid at the fluid-absorber 74 concentrates and holds the fluid against the material that changes color to thereby facilitate identification of the leak. For example, the fluid-absorber 74 may be positioned behind the interior wall 34 (e.g., with or without the one or more conductors 72 that operate to form the closed electrical circuit 76), and the material that changes color may be applied over the interior wall 34 to face the interior environment within the building. It should be appreciated that the components of the leak detection assemblies 30 in FIGS. 2 and 3 may be combined and/or used together in any suitable manner. For example, the components (e.g., the moisture indicator 50 that acts as a fluid-absorber 74 that extends between the conductors 72, the detector 56, the output device 64, the output device 78, the processing circuitry 62, the wireless communication component 66, and/or the battery 68) may be supported within one housing (e.g., the housing 58) to provide multiple different types of alerts (e.g., any of the alerts discussed herein) to the user.

Figure 4:
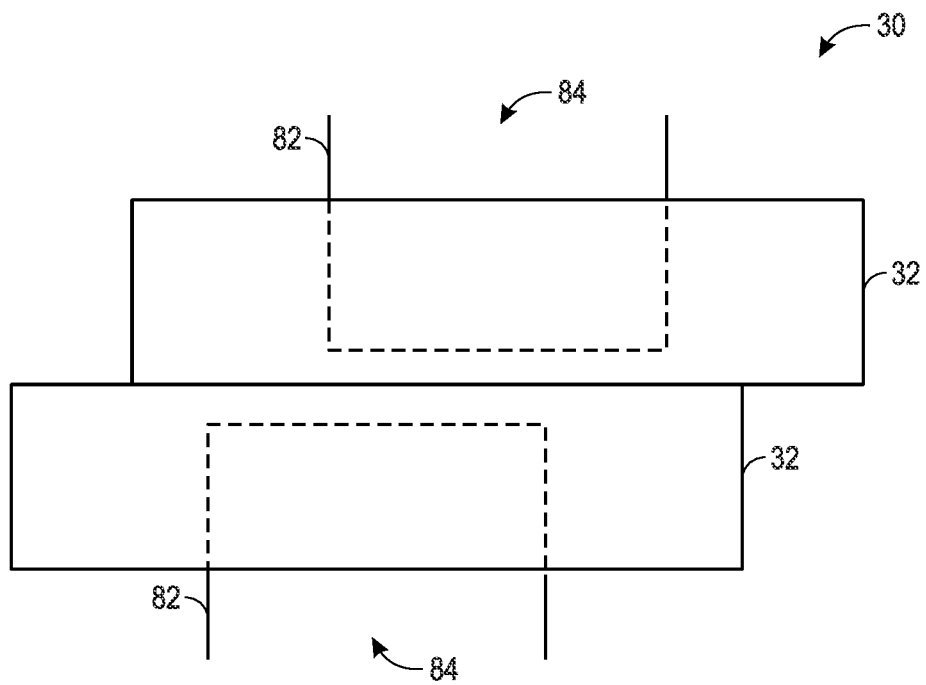
FIG. 4 illustrates a leak detection sensor assembly that may be used in the leak detection system of FIG. 1, wherein the leak detection sensor assembly includes one or more conductors, in accordance with embodiments described herein.

FIG. 4 illustrates one or more conductors 82 (e.g., conductive pad, wire, wire grid, wire mesh) that may be used within the leak detection sensor assembly 30 of the leak detection system 10 of FIG. 1, in accordance with embodiments described herein. In operation, a fluid that leaks into the vicinity of the leak detection sensor assembly 30 may short an electrical circuit 84 (e.g., a continuous or complete electrical circuit) by electrically connecting the one or more conductors 82 and/or by directing the current through the fluid along an unintended path. Without the fluid, the current may flow from the current source at the hub, through a first one of the conductors 82, and then back to the hub. The hub may include or be communicatively coupled to the computing system, which may include processing components that are configured to detect the short in the electrical circuit 84 (e.g., via a change in resistance through the electrical circuit 84) and to provide the alert that indicates the presence of the leak to the user (e.g., via the display). The leak detection sensor assembly 30 may be positioned on or within the roofing shingles 32, the interior walls, or any other suitable structure of the property.

It should be appreciated multiple leak detection sensor assemblies 30 may be arranged about the property (e.g., in a row, a column, or a grid of rows and columns), such as in each roofing shingle, in multiple interior walls, or the like. In this way, the multiple leak detection sensor assemblies 30 may provide additional information about the leak, such as an extent of the leak and/or locations of the leak. Furthermore, the computing system may be configured to receive information from each of the multiple leak detection sensor assemblies 30, reference respective locations of each of the multiple leak detection sensor assemblies 30 (e.g., entered during construction and/or by the user upon installation; stored in a database), and generate a map that shows leak locations (e.g., highlights each of the multiple leak detection sensor assemblies 30 that have detected the leak), for example. The computing system may provide the map via the display and/or communicate the map to the user device (e.g., mobile phone). Additionally, it should be appreciated that features of the leak detection assemblies 30 in FIGS. 2, 3, and 4 may be combined and/or used together in any suitable manner.

Figure 5:
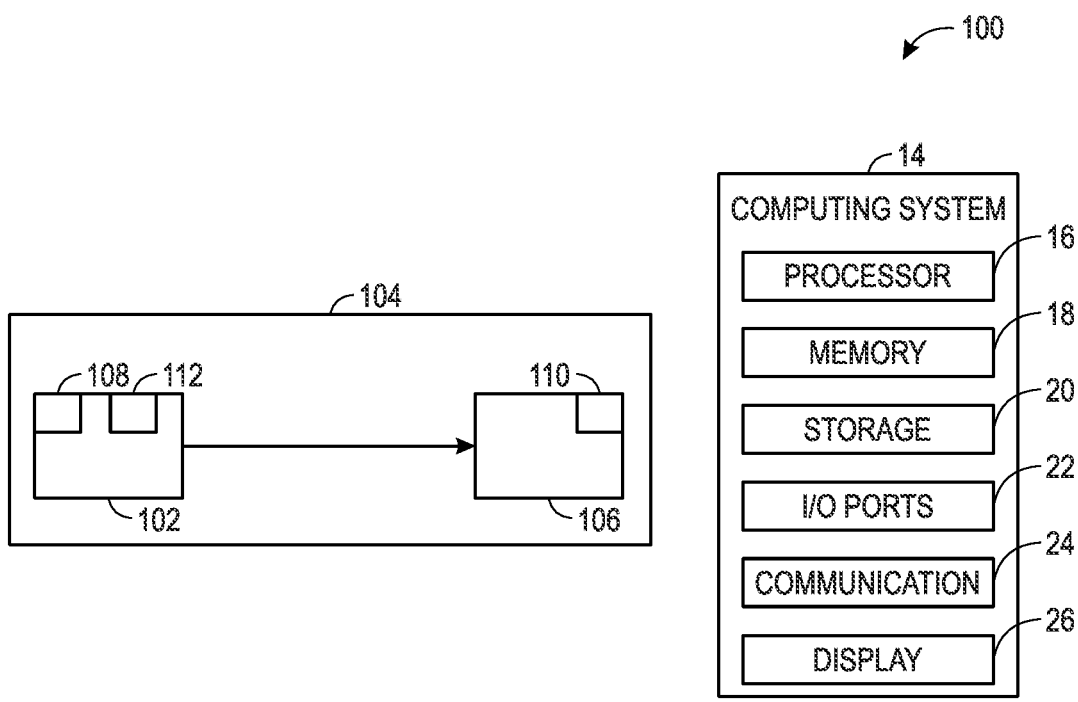
FIG. 5 illustrates a fluid flow monitoring system that may be used in the leak detection system of FIG. 1, in accordance with embodiments described herein.

FIG. 5 illustrates a fluid flow monitoring system 100 that may be used within the leak detection system 10 of FIG. 1, in accordance with embodiments described herein. The fluid flow monitoring system 100 may be configured to monitor an input fluid flow (e.g., input volume) through an inlet 102 into a fluid vessel 104 (e.g., shower, sink, toilet) at the property and an output fluid flow (e.g., output volume) through an outlet 106 from the fluid vessel 104 at the property. The fluid flow monitoring system 100 may include an input flow sensor 108 that is configured to monitor the input fluid flow through the inlet 102 and an output flow sensor 110 that is configured to monitor the output fluid flow through the outlet 106.

The fluid flow monitoring system 100 may use the computing system 14 to compare the input fluid flow to the output flow to determine a flow difference (e.g., volume difference). The fluid flow monitoring system may then use the computing system 14 to compare the flow difference to a threshold and may determine that there is a leak at the fluid vessel 104 in response to the flow difference exceeding the threshold. The threshold may take into account expected fluid loss due to temperature of the fluid (e.g., steam) and/or other factors (e.g., duration of the fluid flow; expected splashing out of the fluid vessel 104, such as during dish washing). Thus, the fluid flow monitoring system 100 may include a temperature sensor 112 that is configured to monitor a temperature of the input fluid flow through the inlet 102 and/or a temperature at another point along the fluid flow path from the inlet 102 to the outlet 106. In response to determining the presence of the leak at the fluid vessel 104, the fluid flow monitoring system 100 may provide an alert (e.g., an audible alert via a speaker, a visual alert via a light emitter and/or the display) that indicates the leak at the fluid vessel 104.

It should be appreciated that the threshold may be established in any of a variety of ways. For example, the threshold may be a baseline flow difference that is established during a test of the fluid vessel 104 (e.g., upon construction of the property, after repair of the fluid vessel 104). During the test, the fluid may be directed from the inlet 102 to the outlet 106, the flow difference may be calculated, and the threshold may be set to be the flow difference (or some variation of the flow difference, such as 5, 10, 15, or 25 percent or more than the flow difference). As another example, the threshold may be set based on historical data from the fluid vessel 104, historical data from other similar fluid vessels, and/or models. Thus, an average or a median flow difference may be calculated, and the threshold may be set to be the average or the median flow difference (or some variation of the flow difference, such as 5, 10, 15, or 25 percent or more than the flow difference). In some embodiments, the fluid flow monitoring system 100 may provide the alert only if the leak at the fluid vessel 104 is detected more than a threshold number of times (e.g., more than 2, 3, 4, 5 times within a certain time period or within a certain number of uses of the fluid vessel 104; more than 2, 3, 4, 5 times in consecutive uses of the fluid vessel 104). Furthermore, the input fluid flow and the output fluid flow may be analyzed in any of a variety of ways to determine the presence of the leak at the fluid vessel 104.

Figure 6:
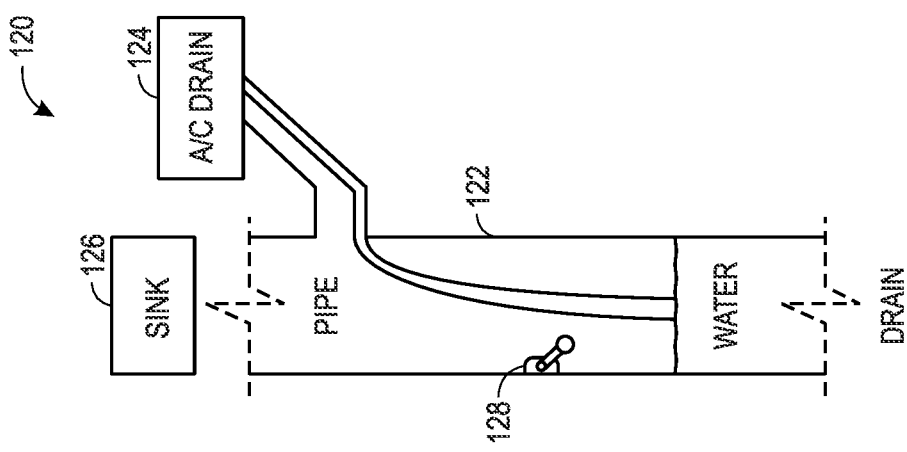
FIG. 6 illustrates a fluid drain monitoring system that may be used in the leak detection system of FIG. 1, in accordance with embodiments described herein.

FIG. 6 illustrates a fluid drain monitoring system 120 that may be used within the leak detection system 10 of FIG. 1, in accordance with embodiments described herein. The fluid drain monitoring system 120 is configured to monitor a fluid level within a drain conduit 122 (e.g., pipe). The fluid level within the drain conduit 122 may indicate inadequate drainage of the fluid through the drain conduit 122 and a potential for a leak to develop upstream from the drain conduit 122 (e.g., such as at an air conditioning unit 124 that drains to the drain conduit 122 of a vessel 126, such as a sink). The fluid drain monitoring system 120 may include a level sensor 128 (e.g., float sensor) that is configured to detect the fluid level within the drain conduit 122.

Figure 8:
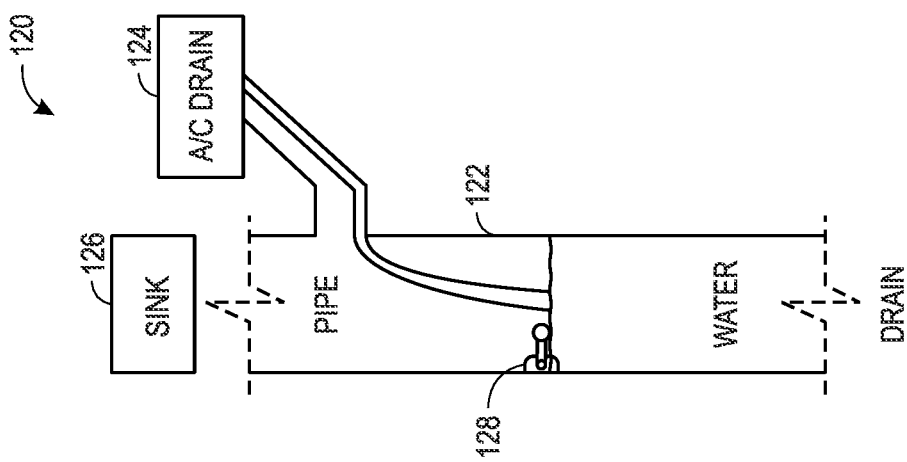
FIG. 8 illustrates the fluid drain monitoring system of FIG. 6 while the level sensor is triggered by the fluid, in accordance with embodiments described herein.
Figure 7:
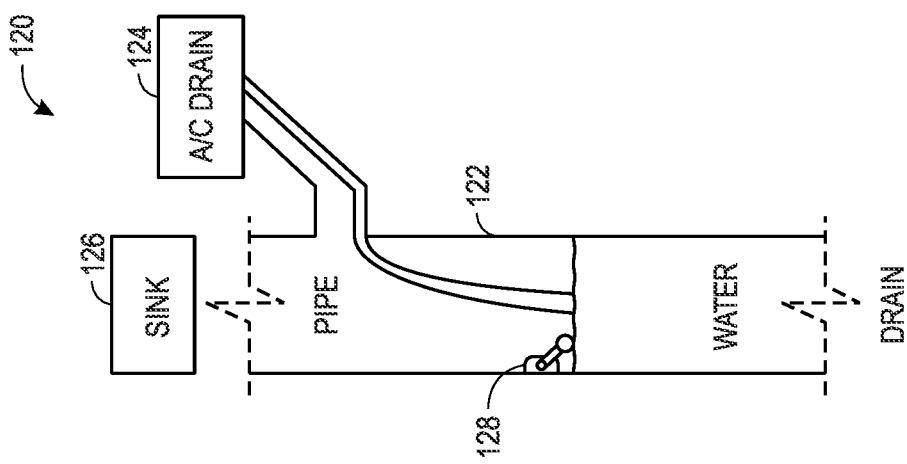
FIG. 7 illustrates the fluid drain monitoring system of FIG. 6 while a level sensor is in contact with a fluid, in accordance with embodiments described herein.

In FIG. 6, the fluid drain monitoring system 120 includes the level sensor 128 in an inactive position, wherein the level sensor 128 is not in contact with the fluid. FIG. 7 illustrates the fluid drain monitoring system 120, wherein the level sensor 128 is in contact with the fluid. FIG. 8 illustrates the fluid drain monitoring system 120, wherein the level sensor 128 is triggered to an active position via contact with the fluid. As shown, the level sensor 128 may trigger a switch when the fluid level within the drain conduit 122 exceeds a threshold (e.g., rises to the level sensor 128), and the fluid drain monitoring system 120 may provide an alert (e.g., an audible alert via a speaker, a visual alert via a light emitter and/or the display) that indicates that the fluid level within the drain conduit 122 exceeds the threshold.

With reference to FIG. 1, it should be appreciated that the processor 16 may be any type of computer processor or microprocessor capable of executing computer-executable code. The memory 18 and the storage 20 may be any suitable articles of manufacture that can serve as media to store processor-executable code, data, or the like. These articles of manufacture may represent computer-readable media (e.g., any suitable form of memory or storage) that may store the processor-executable code used by the processor 16 to perform various techniques disclosed herein. The memory 18 and the storage 20 may represent non-transitory computer-readable media (e.g., any suitable form of memory or storage). It should be noted that non-transitory merely indicates that the media is tangible and not a signal. Data (e.g., thresholds) may be stored in one or more databases, which may be accessible to the computing system 14 and/or may be part of the computing system 14 (e.g., within the storage 20).

The I/O ports 22 may be interfaces that may couple to other peripheral components, such as input devices (e.g., keyboard, mouse). The display 26 may operate as a human machine interface (HMI) to depict visualizations associated with software or executable code being processed by the processor 16. In one embodiment, the display 26 may be a touch display capable of receiving inputs from a user of the computing system 14. The display 26 may be any suitable type of display, such as a liquid crystal display (LCD), plasma display, or an organic light emitting diode (OLED) display, for example. It should be noted that the components described above with regard to the computing system 14 are examples and the computing system 14 may include additional or fewer components. The computing system 14 may include a personal computer, a mobile computer, a hub, or the like that may be positioned within the property 12, carried by the user, or both. In some embodiments, the computing system 14 may be a distributed computing system that includes multiple processors (e.g., one or more cloud computing systems having multiple processors 16).

Advantageously, the disclosed techniques may enable more efficient and accurate identification of leaks at a property (e.g., real property, such as a building). For example, a leak through roofing shingles may be detected via the leak detection sensor assembly, and then an alert may be provided to notify the user and to reduce damage to the property. While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. Furthermore, the features illustrated in FIGS. 1-8 may be combined in any suitable manner. For example, the leak detection sensor assembly may include both the moisture indicator and the electrical circuit components.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A leak detection system, comprising:
 a leak detection sensor assembly configured to be positioned on or within a roofing shingle of a building, the leak detection sensor assembly comprising:
  a plurality of electrical conductors;
  an output device; and
  a fluid-absorber in contact with the plurality of electrical conductors and the output device, wherein the plurality of electrical conductors, the output device, and the fluid-absorber are configured to define a closed electrical circuit with a first volume of fluid present at the fluid-absorber and are configured to define an open electrical circuit with less than the first volume of fluid present at the fluid-absorber, and wherein the fluid-absorber comprises a hydrochromic material that is configured to change colors with a second volume of fluid present at the fluid-absorber;
  wherein the output device is configured to provide a first output in response to a change of color of the hydrochromic material and to provide a second output in response to the closed electrical circuit.

2. The leak detection system of claim 1, wherein the output device comprises a light emitter, and the first output, the second output, or both comprises light.

3. The leak detection system of claim 1, wherein the output device comprises a speaker, and the first output, the second output, or both comprises an audible alert.

4. The leak detection system of claim 1, wherein the fluid-absorber, the plurality of electrical conductors, and the output device are supported by a single housing that is configured to couple to the roofing shingle of the building.

5. The leak detection system of claim 4, wherein the single housing comprises a window to enable visualization of the hydrochromic material through the window while the housing is coupled to the roofing shingle of the building.

6. The leak detection system of claim 1, comprising one or more processors that are configured to detect the closed electrical circuit based on a change in a resistance and to instruct display of a notification via a display.

7. The leak detection system of claim 1, wherein the leak detection system is positioned underneath the roofing shingle of the building.

8. The leak detection system of claim 1, wherein the hydrochromic material is applied over a surface of the fluid-absorber.

9. The leak detection system of claim 1, wherein the output device is configured to provide the first output when the second volume of fluid is present at the fluid-absorber; and wherein the output device is configured to provide the second output when the first volume of fluid is present at the hydrochromic material.

10. A leak detection sensor assembly, comprising:
 a housing configured to be positioned on or within a roofing shingle of a building;
 a plurality of electrical conductors supported within the housing;
 a fluid-absorber supported within the housing in contact with the plurality of electrical conductors, wherein the plurality of electrical conductors and the fluid-absorber are configured to define a closed electrical circuit with fluid present at the fluid-absorber and are configured to define an open electrical circuit without the fluid present at the fluid-absorber;
 a hydrochromic material supported within the housing and configured to exhibit a change in color with fluid present at the hydrochromic material;
 a detector supported within the housing and configured to generate data indicative of the change in color;
 processing circuitry within the housing and configured to process the data to determine an occurrence of the change in color; and
 an output device supported by the housing, wherein the output device is configured to provide a first output in response to the processing circuitry determining a change of color of the hydrochromic material and to provide a second output in response to the processing circuitry determining the closed electrical circuit.

11. The leak detection sensor assembly of claim 10, comprising a battery supported within the housing and configured to provide power to the detector, the processing circuitry, and the output device.

12. The leak detection sensor assembly of claim 10, comprising a wireless communication component configured to transmit an indication of the occurrence of the change in color to a user device.

13. The leak detection sensor assembly of claim 10, wherein the housing comprises a window to enable visualization of the hydrochromic material through the window while the housing is coupled to the roofing shingle of the building.

14. A leak detection system, comprising:
a computing system comprising one or more processors; and
a plurality of leak detection sensor assemblies, wherein a first leak detection sensor assembly of the plurality of leak detection sensor assemblies comprises:
  a housing configured to be coupled to a roofing shingle of a building;
  a hydrochromic material supported within the housing and configured to exhibit a change in color with fluid present at the hydrochromic material;
  a detector supported within the housing and configured to generate data indicative of the change in color; and
  a wireless communication component configured to wirelessly transmit the data indicative of the change in color to the computing system;
  a plurality of electrical conductors supported within the housing;
  an output device supported within the housing; and
  a fluid-absorber in contact with the plurality of electrical conductors and the output device, wherein the plurality of electrical conductors, the output device, and the fluid-absorber are configured to define a closed electrical circuit with fluid present at the fluid-absorber and are configured to define an open electrical circuit without the fluid present at the fluid-absorber;
  wherein the output device is configured to provide a first output in response to a change of color of the hydrochromic material and to provide a second output in response to the closed electrical circuit;
  wherein the one or more processors are configured to create and to instruct display of a map that indicates a leak at a location of the first leak detection sensor assembly in response to receipt of the data indicative of the change in color at the computing system.

15. The leak detection system of claim 14, wherein at least a portion of the housing is transparent to enable visualization of the hydrochromic material through the portion of the housing.

16. The leak detection system of claim 14, wherein the one or more processors are configured to:
  detect the closed electrical circuit based on a change in a resistance; and
  create and to instruct display of the map that indicates an additional leak at a respective location of the second leak detection sensor assembly in response to detecting the closed electrical circuit.

17. The leak detection system of claim 14, wherein the output device is configured to automatically provide the first output and the second output.

18. The leak detection system of claim 14, wherein the first output and the second output are visible, audible, or both at an exterior of the housing.

* * * * *